(12) United States Patent
Vanhoeck (10) Patent No.: US 12,329,248 B2
(45) Date of Patent: Jun. 17, 2025

(54) RIVET AND METHOD OF DISASSEMBLING A RIVET USING PHASE CHANGE

(71) Applicant: REGENERATION BV, Waarschoot (BE)

(72) Inventor: Cédric Vanhoeck, Waarschoot (BE)

(73) Assignee: REGENERATION BV, Waarschoot (BE)

( * ) Notice: Subject to any disclaimer, the term of this patent is extended or adjusted under 35 U.S.C. 154(b) by 0 days.

(21) Appl. No.: 18/552,600

(22) PCT Filed: Apr. 1, 2022

(86) PCT No.: PCT/EP2022/058764
§ 371 (c)(1),
(2) Date: Sep. 26, 2023

(87) PCT Pub. No.: WO2022/207912
PCT Pub. Date: Oct. 6, 2022

(65) Prior Publication Data
US 2024/0172846 A1    May 30, 2024

(30) Foreign Application Priority Data

Apr. 2, 2021 (BE) .................................. 2021/5258

(51) Int. Cl.
*B23P 11/00* (2006.01)
*A44B 17/00* (2006.01)

(52) U.S. Cl.
CPC .......... *A44B 17/0035* (2013.01); *B23P 11/00* (2013.01); *Y10T 29/4981* (2015.01)

(58) Field of Classification Search
CPC .......................... Y10T 29/49815; B23P 11/00
See application file for complete search history.

(56) References Cited

FOREIGN PATENT DOCUMENTS

| EP | 2052637 B2 | 4/2009 |
| EP | 2861793 B1 | 4/2015 |
| JP | 3140636 U | 3/2008 |
| WO | 2021/048735 A1 | 3/2021 |
| WO | 2022/207912 A1 | 10/2022 |

*Primary Examiner* — Jermie E Cozart
(74) *Attorney, Agent, or Firm* — Vorys, Sater, Seymour and Pease LLP (57) ABSTRACT

Methods for disassembling rivets on textile articles. The rivets include at least two separate rivet elements. One of the rivet elements includes a first and a second material. The first material has a melting and/or glass transition temperature of between 50.0 and 300.0° C. and second material has a melting and/or glass transition temperature which is at least 20.0° C. greater than the melting and/or glass transition temperature of said first material. The rivet element that includes the first material and the second material is heated to a temperature between the melting and/or glass transition temperature of the first material and the second material. The first element and the second element are disassembled.

8 Claims, 5 Drawing Sheets

RIVET AND METHOD OF DISASSEMBLING A RIVET USING PHASE CHANGE

TECHNICAL FIELD

The invention relates to a method for disassembling rivets on textile articles. In particular, the invention relates to disassembling rivets on textile articles using phase change.

BACKGROUND

The textile industry is one of the most polluting industries worldwide (after the petrochemical industry) and requires an extremely high water and chemical consumption at the different stages of the production process. Worldwide textile consumption was estimated at 95.6 million tons in 2015. Textile consumption is expected to increase further to around 8.5 trillion tons by 2030. It goes without saying that this growing demand for fashion textiles is exerting great pressure on the limited material and energy resources present on Earth. Today, one full truck of textile is discarded every second. Only 1% of the materials used in the textile industry are recycled materials. However, the focus is increasingly shifting to the circular economy, within which there are many opportunities for the textile industry.

In the textile industry, metal rivets originally performed a fastening and/or reinforcement function, mainly with seams subject to wear. Nowadays rivets are used much more widely in the textile industry, for example as a press-stud, as a lace hole or eyelet, as a connecting means or purely as a decorative detail. Rivets are appreciated, mainly because of their low cost, good strength properties, and their simple manner of application.

Most textile-based products that are composed of several components, and which may have rivets, are very difficult to recycle and/or reuse at the end of their life. If these are nevertheless recycled, an attempt is made to separate the different materials that make up the product. To this end, the textile products are shredded, after which they are possibly sorted by material type under the influence of air pressure, magnetism and/or centrifugation. In this way, among other things, hard materials and/or points are removed from the textile. However, this process is energy intensive and complex, and results in reduced quality and/or economic value of the recycled material. The presence of rivets in these composite textile products is often a very difficult factor in this recycling process and ensures a reduced purity of the recycled materials.

Due to the reduction in quality and purity inherent in the recycling process, recycled textile products are often only suitable for so-called 'down-cycling'. The materials are reused, but they are only used in a significantly different market, for example as filler material in insulation mats and concrete.

Accordingly, there is a need for an efficient process for separating and/or disassembling the individual components of textile articles which include rivets, eliminating shredding, and ensuring the quality and purity of the recycled materials. Reuse of both the rivets and the individual textile components should be simplified here.

EP2861793 describes a sewing method with built-in disassembly function of textile articles. In this method, stitching made from a thread incorporating metal particles will come apart under the influence of electromagnetic waves. However, the presence of rivets in a textile product is still a complicating factor in reuse and recycling thereof.

Textile products comprising rivets must of necessity be shredded in order to remove the rivets.

Disassemblable alternatives to the currently known rivet are currently very scarce.

JP3140636U describes a disassemblable alternative, which, however, is very time-consuming to assemble via a screw mechanism. This mechanism inherently allows for only a limited number of embodiments, where a screw is located centrally through the textile, and where the decorative head of the rivet is specifically designed to allow rotation. The rivet as described in JP'636 is therefore not suitable for press studs, eyelets, or decorative buttons, among others. Moreover, disassembling the rivets requires a lot of manual labour, with each rivet having to be unscrewed separately.

WO2021/048735 describes a disassemblable alternative which, uses shape memory material that allows for automatic thermal disassembly, is costly in production as the chemical crosslinking needed to obtain the shape memory effect requires time and makes continuous and (cost)efficient production impossible.

The object of the present invention is to at least solve some of the above-mentioned problems or disadvantages.

SUMMARY OF THE INVENTION

The invention relates to a method of for disassembling rivets on textile articles, said rivets comprising at least two separate rivet elements, wherein at least one of said rivet elements comprises a first and a second material, wherein said first material has a melting and/or glass transition temperature of between 50.0 and 300.0° C., wherein said second material has a melting and/or glass transition temperature which is at least 20.0° C. higher than the melting and/or glass transition temperature of said first material.

A second aspect of the invention relates to a rivet with built-in disassembly function, the rivet comprising at least two separate rivet elements, wherein at least one of said rivet elements comprises a first and a second material, wherein, said first material has a melting and/or glass transition temperature of between 50.0 and 300.0° C., wherein said second material has a melting and/or glass transition temperature which is at least 20.0° C. higher than the melting and/or glass transition temperature of said first material.

A third aspect relates to a method of manufacturing a textile article, wherein a rivet is applied to said textile article, said rivet comprising at least two separate rivet elements, wherein at least one of said rivet elements comprises a first and a second material, wherein said first material has a melting and/or glass transition temperature of between 50.0 and 300.0° C., wherein said second material has a melting and/or glass transition temperature which is at least 20.0° C. higher than the melting and/or glass transition temperature of said first material.

A fourth aspect relates to a textile article provided with rivets, wherein the rivets comprise at least two separate rivet elements, wherein at least one of said rivet elements comprises a first and a second material, wherein said first material has a melting and/or glass transition temperature of between 50.0 and 300.0° C., wherein said second material has a melting and/or glass transition temperature which is at least 20.0° C. higher than the melting and/or glass transition temperature of said first material.

The herein described method of disassembling and built-in disassembly function eliminates shredding for recycling so that the size of the recycled materials is not further reduced and the mechanical properties of the recycled material are better preserved. In addition, the method according to the present invention enables multi-component textile articles to be easily disassembled at the end of their useful or expected life. This prevents possible contamination of the recycled materials caused by not or poorly disassembling the various parts. Since the decrease in the quality of recycled materials from the textile industry is mainly caused by a decrease in the mechanical properties of the material as well as a reduced degree of purity, the present invention enables a person skilled in the art to indeed obtain high quality recycled products from the textile industry.

The disassembly and reuse of high-quality materials results on the one hand in enormous financial savings in the processing of textile waste and on the other hand, raw materials are also obtained for the production of new textile articles, so that the financial savings also continue in the production of new textile articles. Since much more textile is already being produced today than the material and energy sources on earth allow in principle, the circular reuse of textile products has the advantage that more leeway is created on the market, so that availability and pricing are not put under pressure. Thanks to the possibility of having the disassembly process run semi-automatically or fully automatically, this is, in contrast to the existing processes for recycling textile articles, a low-labour process and therefore also a relatively cheap process.

DETAILED DESCRIPTION

The invention relates to a rivet and a method for disassembling rivets on textile articles.

Unless otherwise defined, all terms used in the description of the invention, including technical and scientific terms, have the meaning as commonly understood by a person skilled in the art to which the invention pertains. For a better understanding of the description of the invention, the following terms are explained explicitly.

In this document, 'a' and 'the' refer to both the singular and the plural, unless the context presupposes otherwise. For example, 'a segment' means one or more segments.

The terms 'comprise', 'comprising', 'consist of', 'consisting of', 'provided with', 'include', 'including', 'contain', 'containing', are synonyms and are inclusive or open terms that indicate the presence of what follows, and which do not exclude or prevent the presence of other components, characteristics, elements, members, steps, as known from or disclosed in the prior art.

Quoting numerical intervals by endpoints comprises all integers, fractions and/or real numbers between the endpoints, these endpoints included.

A first aspect of the present invention relates to a method for disassembling rivets on textile articles, said rivets comprising at least two separate rivet elements, wherein at least one of said rivet elements comprises a first and a second material, characterized in that, said first material has a melting and/or glass transition temperature of between 50.0 and 300.0° C., wherein said second material has a melting and/or glass transition temperature which is at least 20.0° C. higher than the melting and/or glass transition temperature of said first material. By preference, the second material has a melting and/or glass transition temperature which is at least 30.0° C., 35° C., 40° C., most preferably 50° C. higher than the melting and/or glass transition temperature of said first material. Still more preferably, the second material has a melting and/or glass transition temperature which is at least 30.0° C. to 35.0° C., 30.0° C. to 40.0° C., 35.0° C. to 45.0° C., most by preference 35.0° C. to 50.0° C. higher than the melting and/or glass transition temperature of said first material.

In this context, the terms "melt" and "melting" are to be understood as any form of degradation and/or breakdown of a material and/or any of its mechanical properties due to changes in temperature. Examples of such degradation and/or breakdown of a material include, but are obviously not limited to, softening of the material, cracking, pyrolysis, etc.

The present method allows the rivets, and in particular the rivet element comprising the first material, to spontaneously melt or undergo a phase change, which cause said first material to soften and/or breakdown. In this way, the first material loses its mechanical strength under the influence of a changing temperature, which enables the various rivet elements to be easily disconnected.

The term 'rivet' refers to a fastener that consists of at least two separate rivet elements. Generally, one of these elements is a rivet consisting of a pin or rod that has two ends. The first end consists of a bulge, the 'swage head', and the second end consists of a pin. When attaching a rivet, the pin is pushed through a hole in one or more rivet elements, after which the pin is deformed into a second, thickened end, the 'closing head', which ensures a permanent coupling of the various rivet elements. Within the context of the present invention, the term 'rivet' refers to both a functional fastener and an ornamental and/or decorative fastener.

The disassembly and reuse of high-quality textile materials, as well as rivets on these textile materials, while retaining quality and purity, results in enormous financial savings in the processing of textile waste and the production of new textile articles. The method provides a disassembly process that can take place semi-automatically or fully automatically, which makes the recycling of textile articles cheaper and more efficient than the recycling processes as known from the prior art.

In addition, the recycling materials obtained thanks to the invention can be used after disassembling the rivets as raw materials for the production of new textile articles. Thus, according to one embodiment, the rivets of the present invention can be fully or partially reused after disassembly.

In this way, the present invention contributes not only to reducing the total amount of waste generated by the textile industry and the associated pressure on the ecosystem, but also to reduce the energy and water consumption associated with the production of new textile articles.

By preference, said first material has a melting and/or glass transition temperature of between 100.0 and 250.0° C. More by preference, said first material has a melting and/or glass transition temperature of between 130.0 and 200.0° C.

In some embodiments, the second material has a melting and/or glass transition temperature which is at least 25.0° C. higher than the melting and/or glass transition temperature of said first material. By preference, the second material has a melting and/or glass transition temperature which is at least 30.0° C., 35.0° C., 40.0° C., 45.0° C., most by preference at least 50.0° C. higher than the melting and/or glass transition temperature of said first material. Still more preferably, the second material has a melting and/or glass transition temperature which is at least 30.0° C. to 35.0° C., 30.0° C. to 40.0° C., 35.0° C. to 45.0° C., most by preference 35.0° C. to 50.0° C. higher than the melting and/or glass transition temperature of said first material.

According to a further or another embodiment, the disassembling of the rivets on the textile articles is done by heating the rivets to a temperature which is between the melting and/or glass transition temperatures of said first and second material respectively. When the rivet is heated up to said temperature, said first material will undergo a phase change and/or breakdown and will lose mechanical strength, which results in the disconnection of the rivet elements.

According to a further or another embodiment, the second material at least partially encapsulates the first material, wherein said first material is not in direct contact with the textile articles. As a result, the first material which has undergone a phase change will remain encapsulated in the second material. It is thus avoided that the first material remains and/or leaves residues on the textile material in which the rivet has been applied.

In some embodiments, the first material is encapsulated around the second material by means of dipping, spraying, sheet-forming, thermoforming, drawing, deep-drawing, coating, powder coating, injection molding, 2K injection molding, or combinations thereof.

According to some embodiments, said rivets are rivets which are assembled to the textile articles during assembly by mechanical deformation.

Heating may take place both directly and indirectly. Apparatus and/or equipment suitable for achieving the desired temperature are known to those skilled in the art and include, for example, heating devices based on an electrical resistance or devices that use infrared radiation. Indirect heating can be done, for example, by placing the textile article in an oven.

According to a further embodiment, the disassembling of the rivets takes place automatically or semi-automatically. Preferably, the rivets and/or textile articles are shaken or moved during heating. The movement automatically separates rivet elements from each other once the rivets return to their open, permanent form. Preferably, a suitable device, such as an oven, optionally comprises a rotating drum to further separate the parts of the textile article from each other. Automation of the process reduces the costs of the disassembly process as little or no manual labour is involved.

According to a further or alternative embodiment, disassembly takes place in a device comprising a heating unit, provided with heating elements and optionally one or more steam generators. The device may be provided with a rotating drum. Disassembly in such a unit allows simultaneous disassembly of a large number of rivets on different textile articles. The disassembly process may be semi-continuous to continuous.

According to an embodiment, the rivets are removed from the textile article after disassembling the rivets. Rivet as well as various other parts of the textile article can be directly reused as raw material in the production of recycled and/or new textile articles.

A second aspect of the invention relates to a rivet with built-in disassembly function, the rivet comprising at least two separate rivet elements, wherein at least one of said rivet elements comprises a first and a second material, and wherein said first material has a melting and/or glass transition temperature of between 50.0 and 300.0° C., wherein said second material has a melting and/or glass transition temperature which is at least 20.0° C. higher than the melting and/or glass transition temperature of said first material.

By preference, said first material has a melting and/or glass transition temperature of between 100.0 and 250.0° C. More by preference, said first material has a melting and/or glass transition temperature of between 130.0 and 200.0° C.

In some embodiments, the second material has a melting and/or glass transition temperature which is at least 25.0° C. higher than the melting and/or glass transition temperature of said first material. By preference, the second material has a melting and/or glass transition temperature which is at least 30.0° C., 35.0° C., 40.0° C., 45.0° C., most by preference at least 50.0° C. higher than the melting and/or glass transition temperature of said first material. Still more preferably, the second material has a melting and/or glass transition temperature which is at least 30.0° C. to 35.0° C., 30.0° C. to 40.0° C., 35.0° C. to 45.0° C., most by preference 35.0° C. to 50.0° C. higher than the melting and/or glass transition temperature of said first material.

According to a further or another embodiment, the second material at least partially encapsulates the second material. As a result, the first material which has undergone a phase change will remain encapsulated the second material. It is thus avoided that the first material remains and/or leaves residues on the textile material in which the rivet has been applied.

In some embodiments, the first material is encapsulated around the second material by means of dipping, spraying, sheet-forming, thermoforming, drawing, deep-drawing, coating, powder coating, injection molding, 2K injection molding, or combinations thereof.

According to a further or another embodiment, said first material is selected from a group of thermoplastics such as polyoxymethylene, polyethylene, polypropylene, polyamide, polyester, polyether, polylactide, polyurethane, and copolymers of the preceding polymers, or combinations thereof. By preference, the second material can be any thermoplastic which will degrade at a temperature within the melting and/or glass transition temperature range mentioned above.

According to a further or another embodiment, said second material is selected from the group consisting of metals, ceramics, thermoplastics, elastomers, fabrics or thermoset polymers. Advantageously, this second material, being the encapsulating material to the first material, has a melting and/or glass transition temperature which is at least 20° C. higher than the melting and/or glass transition temperature of the first material. Preferably, the second material has a melting and/or glass transition temperature which is at least 30° C., more preferably 40° C., still more preferably 50° C. higher than the melting and/or glass transition temperature of the first material. Still more preferably, the second material has a melting and/or glass transition temperature which is at least 30.0° C. to 35.0° C., 30.0° C. to 40.0° C., 35.0° C. to 45.0° C., most by preference 35.0° C. to 50.0° C. higher than the melting and/or glass transition temperature of said first material. In this way, heat can be applied to the rivet such the materials comprising the rivet reach a temperature that is sufficient to cause the first material to degrade while keeping the mechanical properties of the second material unchanged.

A third aspect of the present invention relates to a method of manufacturing a textile article, wherein a rivet (1) is applied to said textile article, said rivet comprising at least two separate rivet elements (2,3), wherein at least one of said rivet elements comprises a first (13) and a second material (14), and wherein said first material has a melting and/or glass transition temperature of between 50.0 and 300.0° C., wherein said second material has a melting and/or glass transition temperature which is at least 20.0° C. higher than the melting and/or glass transition temperature of said first material.

A fourth aspect of the present invention relates to a textile article provided with rivets, wherein the rivets comprise at least two separate rivet elements, wherein at least one of said rivet elements comprises a first and a second material, and wherein said first material has a melting and/or glass transition temperature of between 50.0 and 300.0° C., wherein said second material has a melting and/or glass transition temperature which is at least 20.0° C. higher than the melting and/or glass transition temperature of said first material.

By preference, the textile article was obtained by a method according to the third aspect, or the textile article comprises one or more rivets according to any of the embodiments of the second aspect.

The impact of the textile industry on the environment cannot be underestimated. The textile industry is one of the most polluting industries in the world. The present invention provides a method by which this can be addressed. Thanks to this invention, the amount of textile articles that are discarded, not recycled or reused can be drastically reduced.

The built-in disassembly function eliminates shredding for recycling so that the size of the recycled materials is not further reduced and the mechanical properties of the recycled material are better preserved. In addition, the method according to the present invention enables multi-component textile articles to be easily disassembled at the end of their useful or expected life. This prevents possible contamination of the recycled materials caused by not or poorly disassembling the various parts. Since the decrease in the quality of recycled materials from the textile industry is mainly caused by a decrease in the mechanical properties of the material as well as a reduced degree of purity, the present invention enables a person skilled in the art to indeed obtain high quality recycled products from the textile industry.

The disassembly and reuse of high-quality materials results on the one hand in enormous financial savings in the processing of textile waste and on the other hand, raw materials are also obtained for the production of new textile articles, so that the financial savings also continue in the production of new textile articles. Since much more textile is already being produced today than the material and energy sources on earth allow in principle, the circular reuse of textile products has the advantage that more leeway is created on the market, so that availability and pricing are not put under pressure. Thanks to the possibility of having the disassembly process run semi-automatically or fully automatically, this is, in contrast to the existing processes for recycling textile articles, a low-labour process and therefore also a relatively cheap process.

The separated components and materials obtained by the invention after disassembling the rivets can be used as raw materials for the production of new textile articles, thanks to the retention of their mechanical properties and their high degree of purity. The rivets themselves can also be reused in the production of a new rivet by separating the different materials out of which the rivet part is made and reusing those in the production of new rivet part components. In this way, the present invention not only helps to reduce the total amount of waste generated by the textile industry and the associated pressure on the ecosystem, but also to reduce the energy and water consumption associated with the production of new, unused textile materials.

In what follows, the invention is described by way of non-limiting figures illustrating the invention, and which are not intended to and should not be interpreted as limiting the scope of the invention.

DESCRIPTION OF FIGURES

Figure 1:
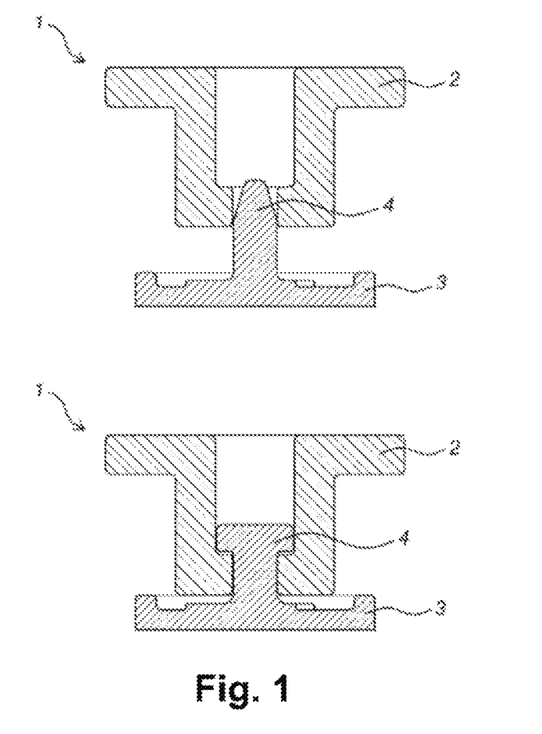
FIG. 1 shows a schematic cross-section of a rivet according to an embodiment of the present invention in open and closed form.

FIG. 1 shows a schematic cross-section of a rivet (1) according to an embodiment of the present invention in open (top) and closed (bottom) form. At the top, the open form of the rivet (1) is shown, wherein the rivet consists of two rivet elements (2,3) connected by means of a stud (4). In the final stage of assembly represented at the bottom of the figure, the stud (4) is shown having a deformed distal end and in this way retaining the two rivet elements (2,3) together. The rivet (1) shown in FIG. 1 comprises a rivet with built-in disassembly function, wherein at least one of said rivet elements comprises a first and a second material, and wherein said first material has a melting and/or glass transition temperature of between 50.0 and 300.0° C., wherein said second material has a melting and/or glass transition temperature which is at least 20.0° C. higher than the melting and/or glass transition temperature of said first material. When heating the rivet to in between said temperatures, it undergoes a phase change, loses mechanical strength and thus disassembles.

Figure 2:
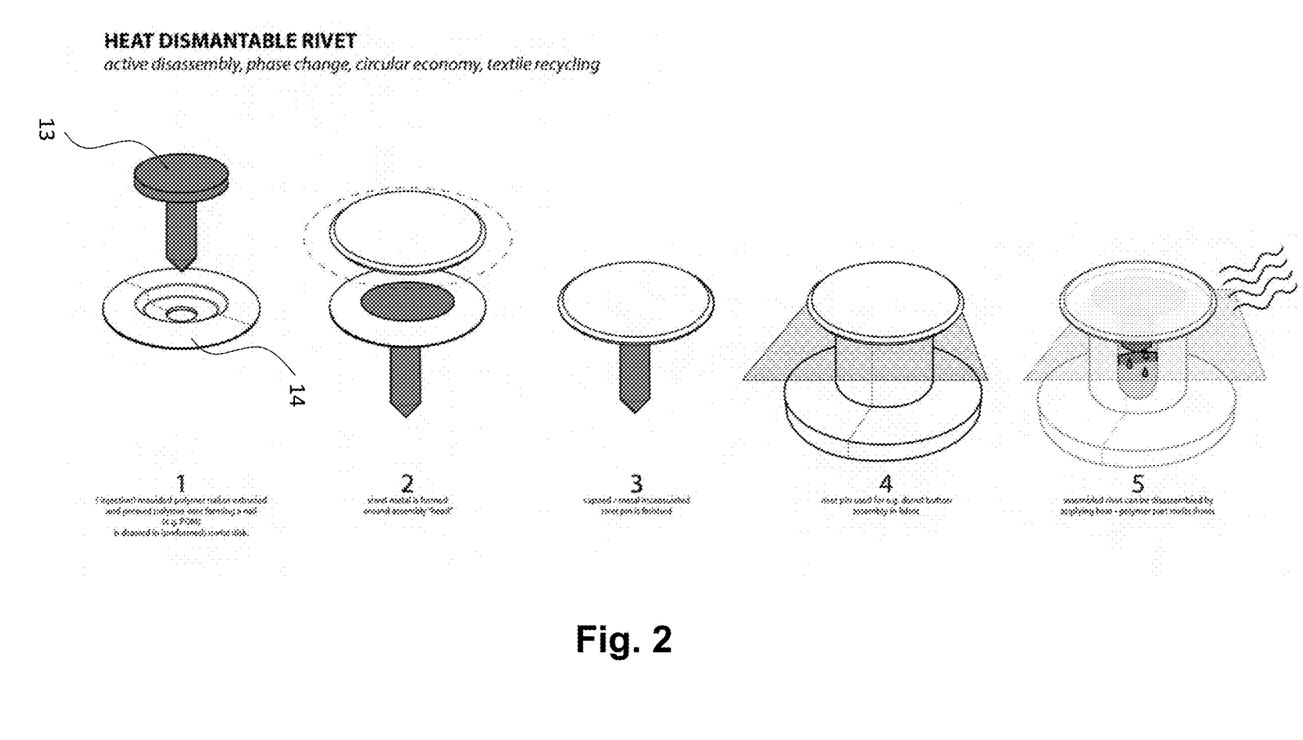
FIG. 2 shows perspective view of a rivet according to an embodiment of the present invention, wherein said rivet is assembled and disassembled.

FIG. 2 shows perspective view of a rivet according to an embodiment of the present invention, wherein said rivet is assembled and disassembled. The rivet (1) shown in FIG. 2 comprises a rivet with built-in disassembly function, wherein at least one of said rivet elements comprises a first (13) and a second material (14), and wherein said first material (13) has a melting and/or glass transition temperature of between 50.0 and 300.0° C., wherein said second material (14) has a melting and/or glass transition temperature which is at least 20.0° C. higher than the melting and/or glass transition temperature of said first material (13). When heating the rivet to in between said temperatures, it undergoes a phase change, loses mechanical strength and thus disassembles. It is shown in FIG. 2 how the second material (14) at least partially encapsulates said first material (13), thereby allowing the rivet to be assembled on a textile article, wherein the first material (13) is not in direct contact with the textile article.

Figure 3:
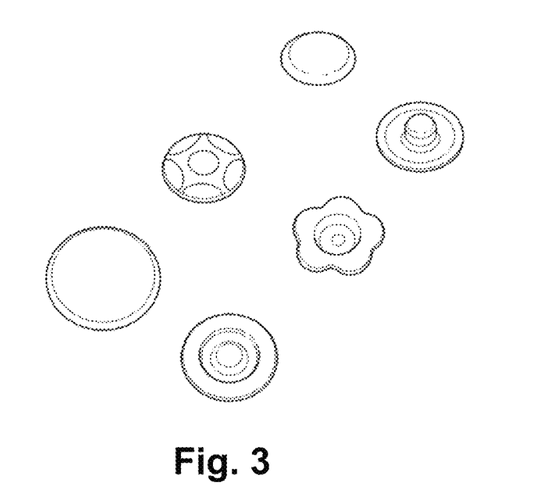
FIG. 3 shows different decorative embodiments of a button/rivet face.

FIG. 3 shows different decorative embodiments of a button/rivet face.

Figure 4:
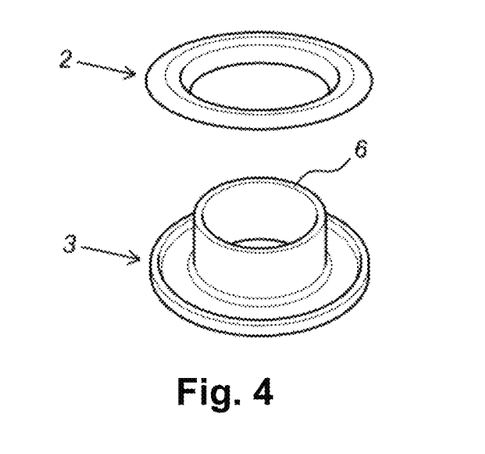
FIG. 4 shows a perspective view of a rivet, in particular of the various rivet elements of a ring opening or 'eyelet', according to an embodiment of the present invention.

FIG. 4 shows a perspective view of a rivet, in particular of the various rivet elements (2,3) of a ring opening or 'eyelet', according to an embodiment of the present invention. In this embodiment the second rivet part which has a hollow stud (6).

Figure 5:
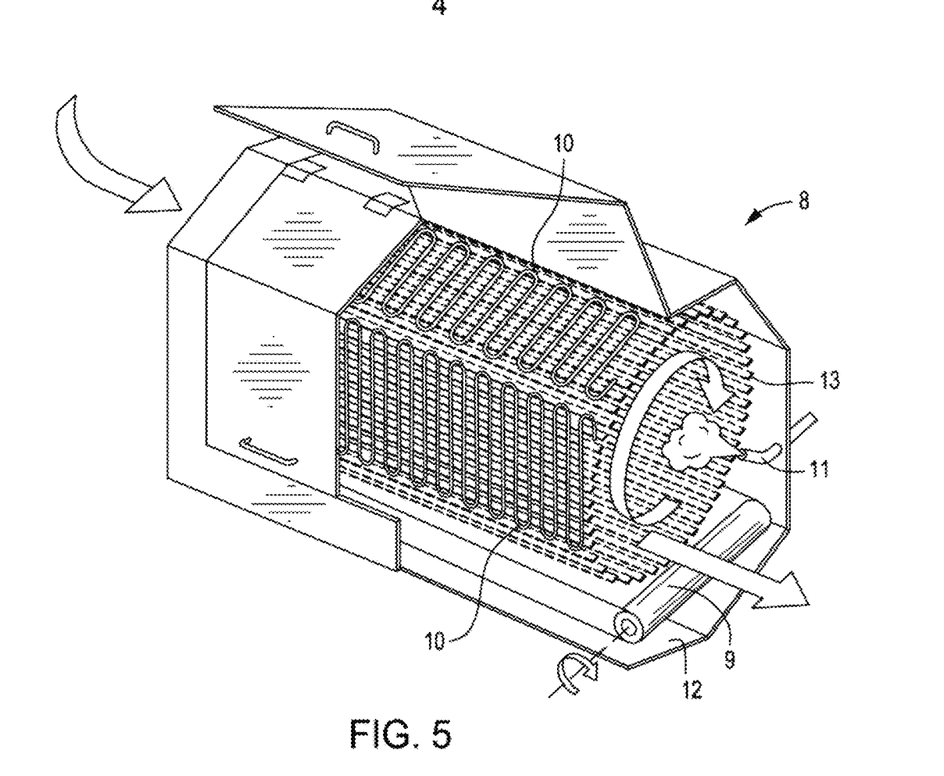
FIG. 5 shows a possible embodiment of a heating unit for disassembling rivets.

FIG. 5 shows a possible heating unit (8) for use in the disassembly process described, where the disassembly process is a continuous process for smaller textile articles such as clothing and accessories. In a preferred form, the heating unit (8) will consist of two sections, namely a heating section and a cooling section (not shown in FIG. 5). In the heating section of the heating unit (8) a turbulent air flow is obtained by means of a tumble function (13) of the device. The textile article is supplied by means of a conveyor belt (9) that runs through the device. The articles are heated intensely and homogeneously by means of heating elements (10) such as heat resistors, infrared heating, or other indirect heat sources. The forced heat convection is further increased due to the moist air flow, i.e. hot and pressurised steam via steam generators (11). A collection system (12) for produced moisture such as water can be provided at the bottom of the device. In a maximum of 5 minutes (preferably less than 3 minutes) the textile product will pass through the steam oven at temperatures of 180 to 200° C. The rivets of the textile product will change from their temporary, closed form to their permanent, open form, whereby the various product components fall apart (manually or automatically, for example by means of the tumble device).

Figure 6:
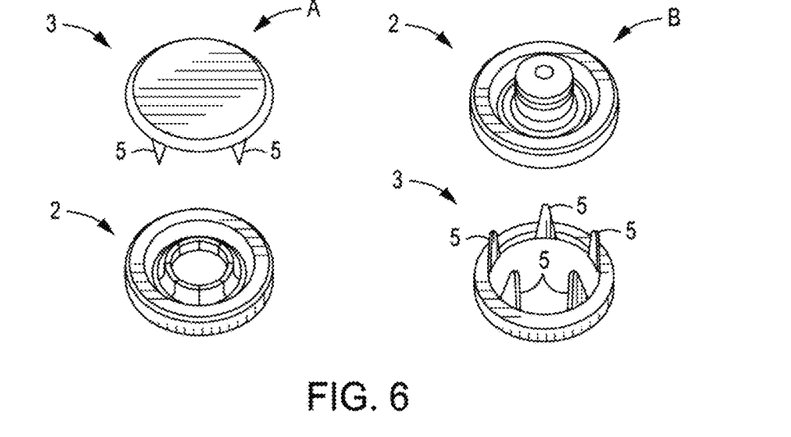
FIG. 6 shows a perspective view of a rivet, in particular of the various rivet elements of a press stud, according to an embodiment of the present invention.

FIG. 6 shows a perspective view of a rivet, in particular of the various rivet elements of a press stud, according to an embodiment of the present invention. The press stud essentially comprises two rivets (A,B), each of which is attached to two separate textile parts, to be connected by the press stud. A press stud as shown in FIG. 6, for example, is commonly used as a closure on a denim jacket. There is an externally visible rivet (A) and an invisible rivet (B) when the press stud is closed. The second rivet element (3) of the rivet A is provided with a plurality of prongs (5) with which it may be rigidly attached with the first rivet element (2). The first rivet element (2) of the rivet B is provided with a plurality of prongs (5) with which it may be rigidly attached with the second rivet element (3).

Figure 7:
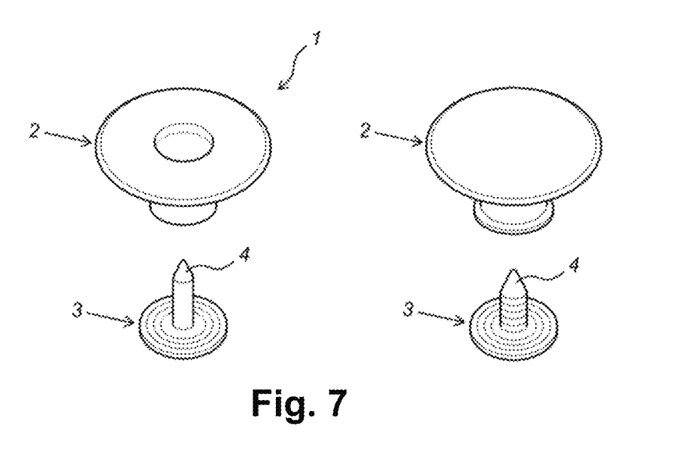
FIG. 7 shows a perspective view of a rivet, in particular of the various rivet elements of a donut button, according to an embodiment of the present invention.

FIG. 7 shows a perspective view of a rivet, in particular of the various rivet elements of a donut button, according to an embodiment of the present invention. The rivet (1) comprises two rivet elements (2,3), wherein at least one of said rivet elements comprises a first and a second material (13, 14), and wherein said first material (13) has a melting and/or glass transition temperature of between 50.0 and 300.0° C., wherein said second material (14) has a melting and/or glass transition temperature which is at least 20.0° C. higher than the melting and/or glass transition temperature of said first material (13). When heating the rivet to in between said temperatures, it undergoes a phase change, loses mechanical strength and thus disassembles.

Figure 8:
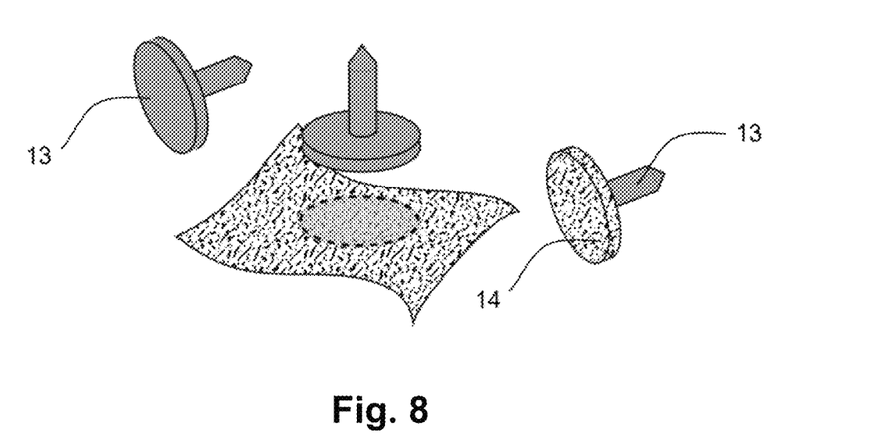
FIG. 8 shows an embodiment of the current invention, comprising the steps of wrapping a piece of a first material in a sheet of a second material in order to make a second element of a rivet.

FIG. 8 shows an embodiment of the current invention, comprising the steps of wrapping a piece of a first material (13) in a sheet of a second material (14) in order to make a second element (3) of a rivet (1). The figure shows a first stage of assembling a second element (3) wherein a piece of the first material (13) is shown uncoated. The figure shows second stage wherein. A sheet of a second material (14) is shown being applied to the piece of the first material (13). In a third stage, the figure shows a complete second element (3) wherein part of the piece of the first material (13) is only partially encapsulated in the second material (14).

LIST OF NUMBERED ITEMS 1 rivet
2 first rivet element
3 second rivet element
4 stud
5 prong
6 hollow stud
8 heating unit
9 conveyor belt
10 heating elements
11 steam generator
12 collection system
13 first material
14 second material

The invention claimed is:

1. A method for disassembling rivets on textile articles, the method comprising:
    obtaining rivets comprising at least two separate rivet elements, wherein at least one of the rivet elements comprises a first material and a second material, the first material comprises a melting and/or glass transition temperature of between 50.0° C. and 300.0° C., and the second material comprises a melting and/or glass transition temperature of at least 20.0° C. greater than the melting and/or glass transition temperature of the first material;
    heating the rivets to a temperature between the melting and/or glass transition temperature of the first material and the melting and/or glass transition temperature of the second material; and
    disassembling the first material from the second material.

2. The method according to claim 1 wherein said first material has a melting and/or glass transition temperature of between 100.0 and 250.0° C.

3. The method according to claim 1, wherein the disassembling of the rivets on the textile articles occurs during the heating.

4. The method according to claim 1, wherein the second material at least partially encapsulates the first material, wherein said first material is not in direct contact with the textile articles.

5. The method according to claim 1, wherein said rivets are rivets which are assembled to the textile articles during assembly by mechanical deformation.

6. The method according to claim 1, wherein the rivets are directly or indirectly heated.

7. The method according to claim 1, wherein the disassembly takes place in a device for disassembling rivets, the device comprising a heating unit, provided with one or more heating elements, and optionally one or more steam generators.

8. The method according to claim 1, wherein the rivets are removed after disassembly.

* * * * *